(12) United States Patent  
Fernández et al.

(10) Patent No.: US 8,873,116 B2  
(45) Date of Patent: Oct. 28, 2014

(54) SHEET SCANNERS

(75) Inventors: David Chanclón Fernández, Cornella de Llobregat Barcelona (ES); Xavier Alonso Becerro, Sant Cugat del Valles (ES); Joan Sanjuán Mercadal, Sant Cugat del Valles (ES); Emilio López Matos, Sant Cugat del Valles (ES); Gianni Cessel, Rubi Barcelona (ES); Ricardo Sanchis Estruch, Sant Cugat del Valles (ES); Ignacio De Olazábal Zugasti, Sant Cugat Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 142 days.

(21) Appl. No.: 13/485,431

(22) Filed: May 31, 2012

(65) Prior Publication Data

US 2013/0321883 A1 Dec. 5, 2013

(51) Int. Cl.
*H04N 1/04* (2006.01)
(52) U.S. Cl.
USPC ........... 358/498; 358/488; 358/486; 358/496; 358/497
(58) Field of Classification Search
None
See application file for complete search history.

(56) References Cited

U.S. PATENT DOCUMENTS

| 2001/0020765 | A1* | 9/2001 | Araki et al. ................. 271/125 |
| 2004/0062579 | A1* | 4/2004 | Iwago et al. ................. 399/367 |
| 2007/0052156 | A1 | 3/2007 | Lee et al. |
| 2009/0085279 | A1* | 4/2009 | Wakakusa et al. ........... 271/145 |
| 2009/0122366 | A1* | 5/2009 | Matsumoto ................... 358/498 |
| 2009/0137374 | A1* | 5/2009 | Kobayashi et al. ........... 493/424 |
| 2012/0245012 | A1* | 9/2012 | Nozawa et al. ............... 493/405 |

FOREIGN PATENT DOCUMENTS

| JP | 3136070 A | 6/1991 |
| JP | 10218504 A | 8/1998 |
| JP | 10274867 A | 10/1998 |

* cited by examiner

*Primary Examiner* — Mark Zimmerman  
*Assistant Examiner* — Helen Q Zong

(57) ABSTRACT

A sheet scanner comprises a sheet inlet on a front side, a scanned sheet outlet on a rear side, and a deflector to direct scanned sheets from the outlet towards the front side of the scanner, over the top cover thereof, and further comprises a stopper on the top cover, at the front side of the scanner and above the sheet inlet, to temporarily restrain the leading edge of a scanned sheet such that the sheet advances and folds over itself and beyond the stopper, the leading edge being released from the stopper when the sheet folded over itself and beyond the stopper pulls it downwards.

20 Claims, 5 Drawing Sheets

SHEET SCANNERS

BACKGROUND

Safe, reliable and user-friendly handling of the original sheets to be scanned in a scanner device is a relevant issue in such devices, even more so when the scanner is suitable for large format originals, which cannot be simply stored on a tray. Managing the originals may be critical also because they may be unique documents that should not suffer any damage.

Handling solutions are known in which the original exits the scanner at the rear side of the device and is collected there; however, this requires extra space, the user needs to access the rear side of the scanner to retrieve the scanned sheet, and there is also some risk of damage for the original; in other solutions, the movement of the sheet is reversed after scanning, such that the sheet returns to the front side of the device through the same path; but in this case there is a higher risk that the original suffers some damage.

In some scanners the original is loaded at the front side of the device, it is outputted at the rear side after being scanned, and then it is deflected back from the outlet to the front side of the device, sliding over the top cover. This facilitates handling by the user and prevents the original from crashing or accumulating at the rear of the device.

However, in such scanners there is a risk that a sheet may re-enter the scanner inlet. This is generally not desirable, and may cause jams or malfunctioning in the device; furthermore, there is a relevant risk that the original sheet may become damaged.

In scanners according to examples of the present invention the risk of jams or damage to the originals is reduced, while easy access and handling by the user are preserved.

BRIEF DESCRIPTION OF THE DRAWINGS

Some non-limiting examples will be described in the following with reference to the appended drawings, in which.

DETAILED DESCRIPTION

Figure 1:
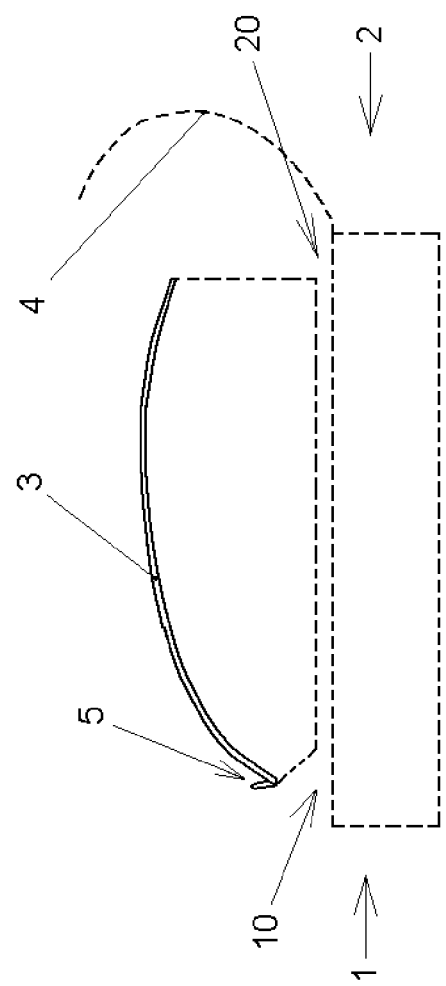
FIG. 1 shows schematically in cross section an example of a sheet scanner.

As shown in FIG. 1, in one example sheet scanners may have a front side 1, a rear side 2, and a top cover 3. They may comprise a sheet inlet 10 on the front side, where an original sheet S may be inputted to be scanned, and a scanned sheet outlet 20 on the rear side, from where the sheet may emerge once scanned. A scanner may further comprise a deflector 4 to direct scanned sheets from the outlet 20 towards the front side 1 of the scanner, over the top cover 3, such that the user doesn't need to reach the rear of the device in order to recover the original.

The scanner may further comprise a stopper 5 on the top cover 3; the stopper 5 may be located at the front side 1 of the scanner, and above the sheet inlet 10.

Figure 2:
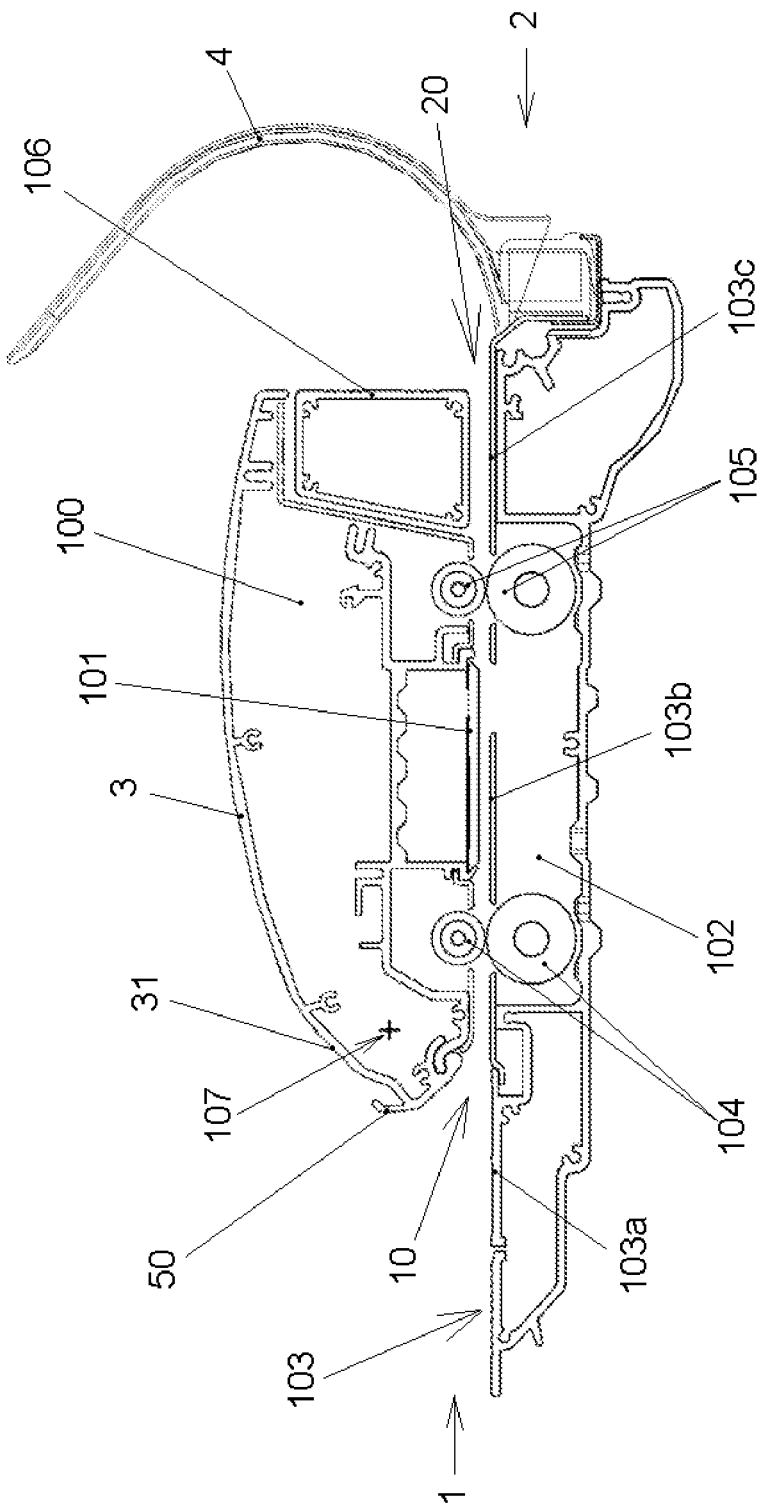
FIG. 2 shows schematically in cross section another example of a sheet scanner, in more detail.

FIG. 2 shows another example of a sheet scanner: like the example in FIG. 1, the scanner comprises a front side 1, a rear side 2, and a top cover 3. A sheet inlet 10 may be arranged on the front side, a scanned sheet outlet 20 may be on the rear side, and a deflector 4 may direct scanned sheets from the outlet 20 towards the front side 1 of the scanner, over the top cover 3.

The scanner may further comprise an upper housing 100, which comprises the top cover 3 and contains scanning sensors 101, as well as electronic components and other elements (not shown) of the scanner, and a lower housing 102 with a platen 103 on which original sheets are conveyed through the scanner and past the scanning sensors 101.

The platen 103 comprises an input platen 103a, a scanning platen 103b under the scanning sensors 101, and an output platen 103c.

A pair of sheet input rollers 104 and a pair of sheet output rollers 105 are arranged to convey the sheet through the scanner from the inlet 10, past the outlet 20, and over the top cover 3.

A scanner supporting structure, of which a beam 106 is shown in FIG. 2, may comprise a hinge axis 107 near the front side 1 of the scanner, on which the upper housing 100 may be hinged such that it can be pivoted to access an interior part of the scanner.

The top cover 3 may comprise a stopper 50 at the front side 1 of the scanner, and above the sheet inlet 10.

In examples disclosed herein, the stopper, for example stopper 5 of FIG. 1, or stopper 50 of FIG. 2, is set to temporarily restrain the movement of the leading edge of a scanned sheet which advances over the top cover 3, when the edge abuts against the stopper. Then the sheet continues advancing and folds over itself and beyond the stopper, and the leading edge of the sheet is released from the stopper when the sheet folded over itself and beyond the stopper pulls it downwards.

The stopper thus causes the sheet to first stop and then jump past the stopper, with its leading edge tending to curl upwards because it is pulled by the sheet folded over itself and beyond the stopper, and fall clear from the scanner inlet; the risk of the sheet re-entering the scanner is therefore reduced, and as a consequence the risk of jams or damage to the originals is reduced. Furthermore, even long originals may be more safely scanned.

An example of how the stopper operates is shown with more detail in the sequence of FIGS. 3a to 3f, which show a scanner such as that of FIG. 2 in operation: after the leading edge has abutted against the stopper 50 the sheet forms a bubble over the top cover 3, due to the further advance of the rest of the sheet, and the weight of the sheet that folds over itself and beyond the stopper causes the leading edge of the sheet to jump the stopper 5.

Figure 3A:
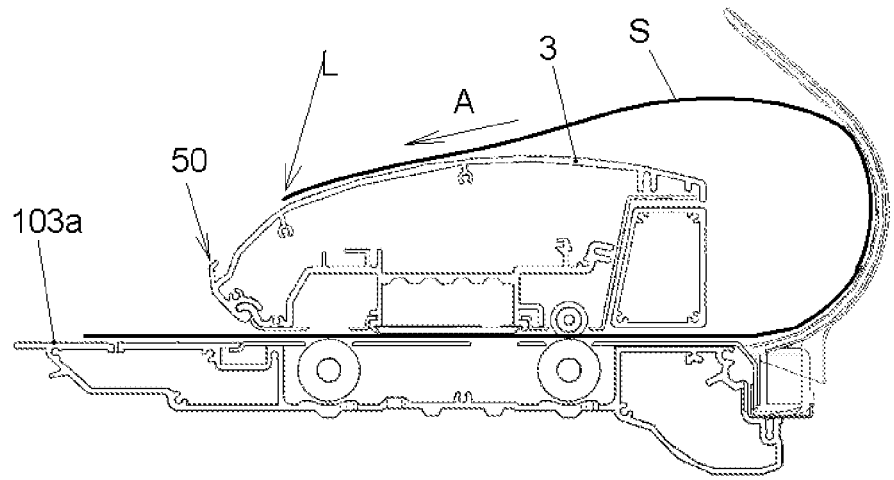
FIGS. 3a to 3f illustrate schematically an example of a scanning operation.
Figure 3B:
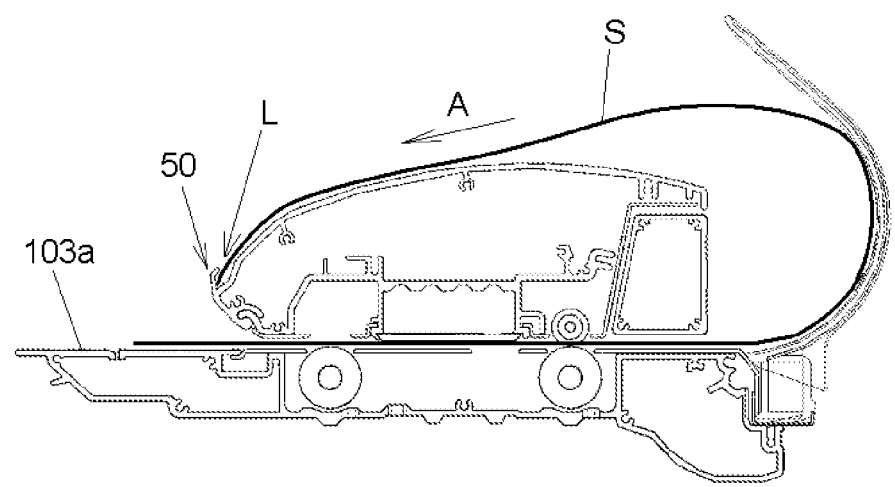

In FIG. 3a, a scanned sheet S with a leading edge L is shown advancing in the direction shown by arrow A, over the top cover of the scanner.

Figure 3C:
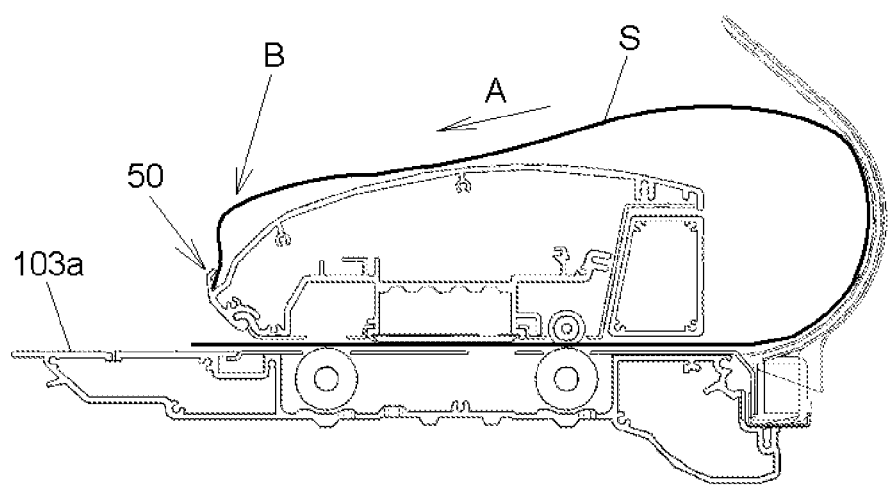
Figure 3D:
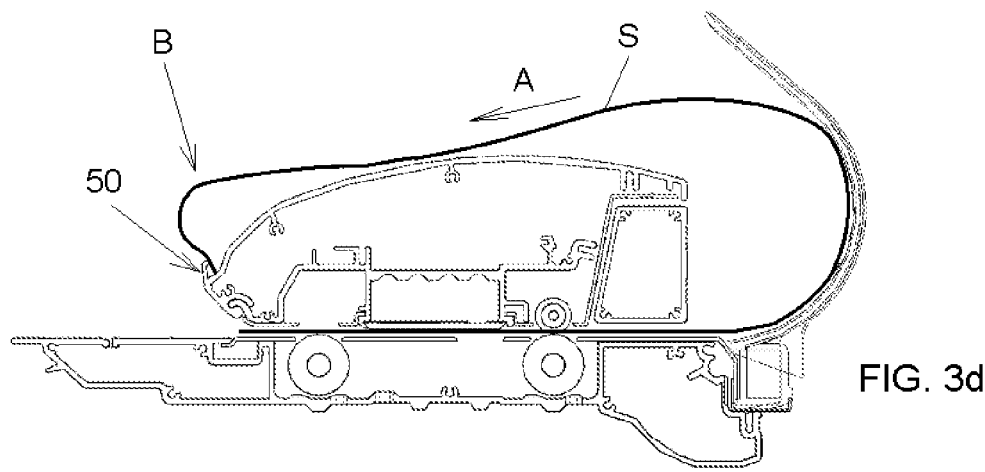
Figure 3E:
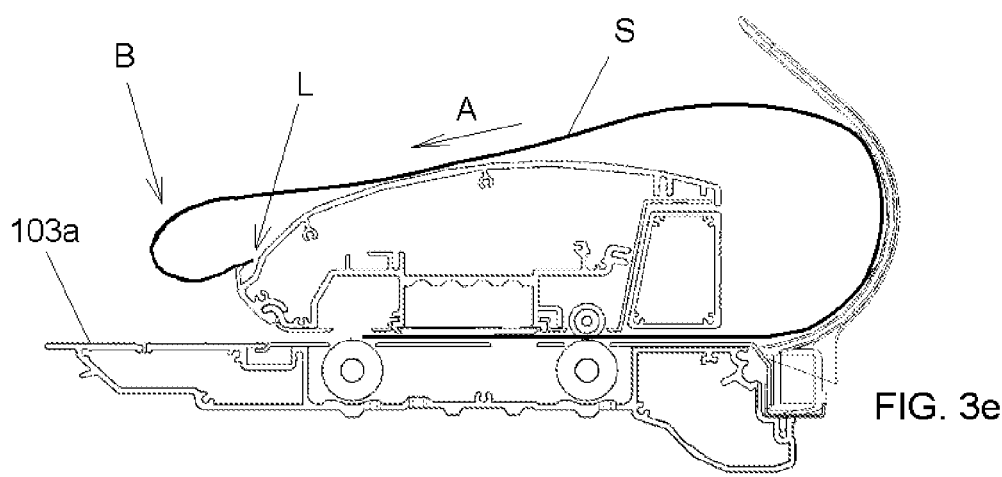

When the leading edge L reaches the stopper 50 (FIG. 3b), it is restrained in its movement and it cannot advance further. However, the rest of the sheet S continues being advanced by the scanner, and therefore starts forming a bubble B over the top cover (FIG. 3c).

The bubble B grows beyond the stopper 50 (FIG. 3d), i.e. it grows towards the left of the figure advancing the stopper, and starts exerting a force on the leading edge of the sheet S that tends to pull it out of the stopper.

Figure 3F:
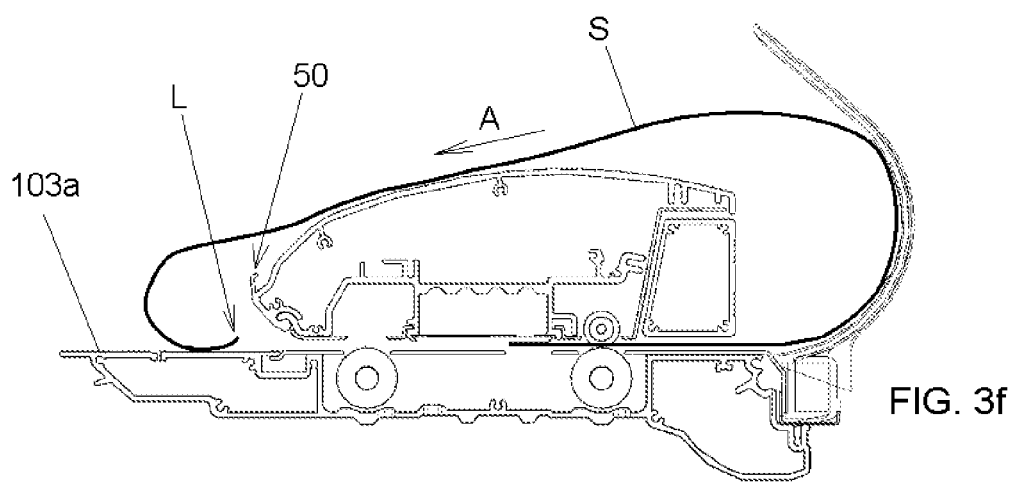

When the bubble B has grown enough to pull the leading edge downwards (FIG. 3e), the leading edge jumps the stopper 50 and falls (FIG. 3f).

The weight of the bubble or fold of the sheet beyond the stopper 50 pulls the leading edge downwards, and tends to pull it away from the inlet 10 of the scanner, so the leading edge L of the sheet falls clear of the inlet 10 (in the example of the figure, it falls on the inlet platen 103*a*), and the risk of the sheet re-entering the scanner is reduced.

Furthermore, the bubble or fold of the sheet beyond the stopper causes the sheet to curl, and when the leading edge L jumps or is released from the stopper it tends to be curled upwards (FIG. 3*f*), which may also help to prevent it from re-entering the scanner.

If the sheet S is very long and continues advancing, after the position of FIG. 3*f*, the bubble or fold will continue growing on the platen 103*a* until it may fall from the edge of the platen, at the left of the figure.

Furthermore, if in practice the platen 103 of the scanner is inclined towards the left of the figure instead of being horizontal, for example because the scanner is arranged at an angle over a printing device or the like, then gravity may help the sheet to fall from the platen.

If part of the sheet S is still on the platen 103*a* and advancing towards the inlet 10 when the leading edge L jumps the stopper 50, then the leading edge L may fall on the advancing sheet S; however, the advance of the sheet on the platen towards the right, combined with the advance of the top of the bubble towards the left will then tend to cause further curling of the scanned sheet, and therefore the leading edge of the sheet may be prevented from entering the scanner inlet.

A method for circulating sheets in a scanner such as disclosed, which has a first side, a second side opposite the first side, and a top portion, may comprise causing a sheet to enter the scanner from the first side and exit from the second side after being scanned; deflecting the scanned sheet so it advances over the top of the scanner back towards the first side; providing an abutment for the leading edge of the sheet near the first side of the scanner; and allowing the rest of the sheet to advance and fold over the abutment such that the weight of the folded sheet causes the leading edge to raise and jump the abutment.

Figure 4:
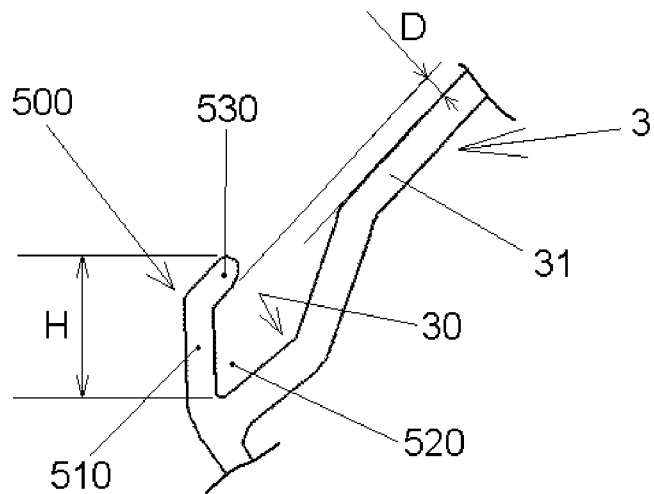
FIG. 4 shows schematically an example of a stopper on the top cover of a sheet scanner.

FIG. 4 shows in enlarged view a detail of another example of a stopper in a scanner.

As shown in this figure, a stopper 500 may comprise a lip 510 protruding from the surface of the top cover; such a lip may form a substantially V-shaped notch 520 with the surface of the top cover 3. Such a notch may help maintaining the leading edge of the sheet at the position of the stopper until it is pulled free by the sheet fold or bubble beyond the stopper.

The stopper may further comprise at its free end a tab 530 inclined towards the top cover 3 that may help ensuring that the leading edge of the sheet abuts against the stopper instead of sliding past it.

The surface of the top cover 3 may also have a recessed portion 30 in the region adjacent the lip 510 of the stopper 500, such that the top cover and the stopper define between them a general hook shape. This may also help maintaining the leading edge at the stopper position as convenient.

In some example, the height H of the stopper above the surface of the top cover 30 may be about 8 mm; the distance D between the top cover 3 in the region where the leading edge of the media slides on the cover (before the recessed portion 30) and the underside of the tab 530 may be about 1.1 mm.

Other shapes and dimensions are possible for the stopper: for example it may define a space different from a V-shaped notch with the surface of the top cover, and there may be no tab at its free end (for example as in FIG. 1), provided it complies with the function of temporarily retaining the leading edge of the scanned sheet, as disclosed in the examples above.

In some examples, such as that of FIG. 4, the stopper 500 may be integral with the top cover 3; this allows a stopper to be provided on a scanner at a reduced manufacturing cost; furthermore such a stopper may require no assembly or service, and may present a pleasant aesthetic appearance together with the top cover.

The top cover 3 may have a portion 31 (for example as shown in FIGS. 2 and 4) that slopes downwards towards the stopper 500, in a direction of advance of the scanned sheet over the cover 3. The inclination of a portion 31 of the top cover facilitates directing the leading edge of the sheet towards abutment with the stopper, and helps the growth beyond the stopper of the fold or bubble formed by the sheet.

The stopper only needs to have relatively small dimensions; therefore, in scanners such as that of the example of FIG. 2, where the upper housing can pivot about hinge axis 107 in order to access an interior part of the scanner, the stopper may remain at a distance from the platen 103 and does not interfere with the pivoting movement or hinder it.

Figure 5:
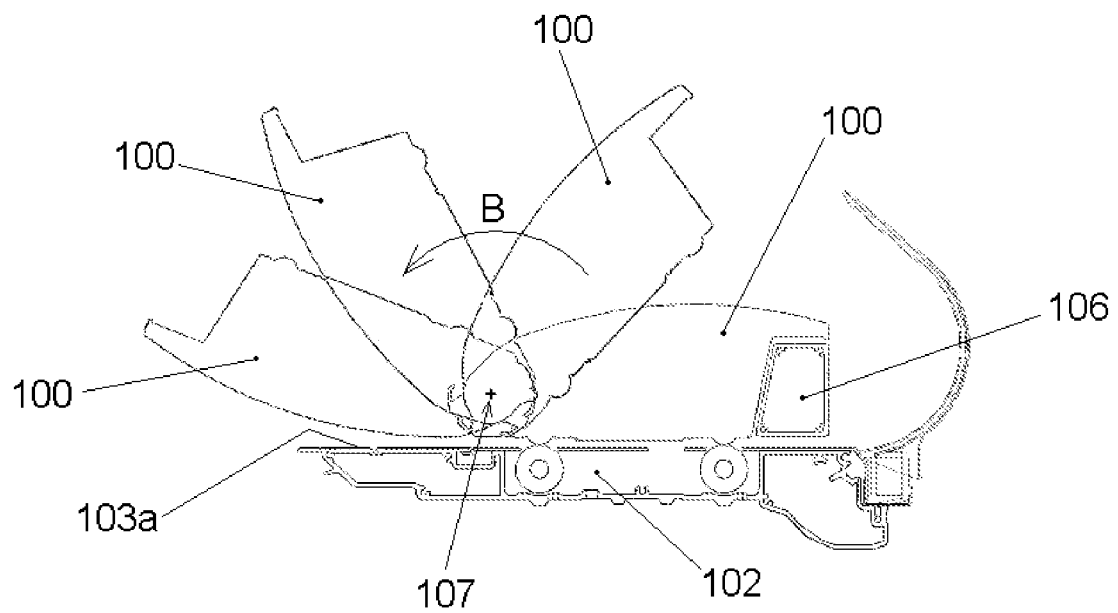
FIG. 5 shows schematically an example of a scanner with an upper housing in several positions, during opening to access an interior part of the scanner.

FIG. 5 shows schematically an example of the scanner with a hinge axis 107, with the upper housing 100 shown in several positions during pivoting from a closed position to an open position, as indicated by arrow B. The stopper may remain at a distance from the platen 103*a* during all the movement, because of its small dimensions.

A scanner according to examples as disclosed herein may also be associated to other devices; for example, it may be associated to a large format printer such as to print copies of the scanned originals. In some cases a scanner may be placed above a printer and in some examples it may be arranged at an angle, for example about 20° with respect to a horizontal plane, such that the inlet side of the scanner is at a lower level than the rear side, and the scanner platen is inclined.

Although only a number of particular examples have been disclosed herein, further variants and modifications of the disclosed print media products are possible; other combinations of the features of embodiments or examples described are also possible. The scope of the present invention should not be limited by particular examples, but should be determined only by a fair reading of the claims that follow.

What is claimed is:

1. A sheet scanner having a front side, a rear side, and a top cover, and comprising a sheet inlet on the front side, a scanned sheet outlet on the rear side, and a deflector to direct scanned sheets from the outlet towards the front side of the scanner, over the top cover, and further comprising a stopper on the top cover, at the front side of the scanner and above the sheet inlet, to temporarily restrain the leading edge of a scanned sheet wherein the sheet advances and folds over itself and beyond the stopper, the leading edge being released from the stopper when the sheet folds over itself and beyond the stopper pulling the sheet downwards.

2. A scanner as claimed in claim 1, wherein the top cover comprises a portion that slopes downwards towards the stopper, in a direction of advance of the scanned sheet over the cover.

3. A scanner as claimed in claim 1, wherein the stopper is integral with the top cover.

4. A scanner as claimed in claim 1, wherein the stopper is attached to the top cover.

5. A scanner as claimed in claim 1, wherein the stopper extends along substantially all the width of the cover in a direction at right angles to a direction of advance of the scanned sheet over the cover.

6. A scanner as claimed in claim 5, wherein the stopper is continuous.

7. A scanner as claimed in claim 1, wherein the stopper comprises a lip protruding from a surface of the top cover.

8. A scanner as claimed in claim 7 wherein the lip forms a substantially V-shaped notch with the surface of the top cover.

9. A scanner as claimed in claim 7, wherein the lip comprises at its free end a tab inclined towards the top cover.

10. A scanner as claimed in claim 7, wherein the surface of the top cover has a recessed portion in the region adjacent the lip of the stopper, such that the top cover and the stopper define between them a general hook shape.

11. A scanner as claimed in claim 1, comprising a scanner supporting structure, a platen on which an original sheet is conveyed through the scanner, and an upper housing arranged above the platen and comprising the top cover, wherein the upper housing is hinged to the supporting structure near the front side of the scanner such that it can be pivoted to access an interior part of the scanner, and wherein the stopper remains at a distance from the platen when the upper housing is pivoted to access an interior part of the scanner.

12. A stopper for a sheet scanner as claimed in claim 4.

13. A large format printer comprising a scanner as claimed in claim 1.

14. A method for circulating sheets in a scanner having a first side, a second side opposite the first side, a top, and an abutment on the top, at the front side of the scanner, the method comprising
    causing a sheet to enter the scanner from the first side and exit from the second side after being scanned,
    deflecting the scanned sheet so it advances over the top of the scanner back towards the first side,
    causing a leading edge of the sheet to contact the abutment as it advances and causing the sheet to fold over itself, and
    continuing to advance the sheet after the leading edge contacts the abutment and the sheet folds over itself, wherein weight of the folded sheet causes the leading edge to raise and jump the abutment.

15. A device comprising:
    a front side;
    a rear side;
    a top cover;
    a sheet inlet on the front side;
    a sheet outlet on the rear side;
    a deflector to direct a sheet from the sheet outlet towards the front side and over the top cover;
    sheet rollers advancing the sheet towards the top cover;
    a stopper on the top cover, at the front side of the scanner, and above the sheet inlet, to temporarily restrain a leading edge of the sheet as it advances from the sheet inlet and is deflected by the deflector over the top cover,
    wherein the stopper includes a tab inclined over the top cover to pull the leading edge of the sheet downwards when the leading edge is temporarily restrained by the stopper, and the sheet rollers continue to advance the sheet after it is temporarily restrained, causing the leading edge to fold over itself and beyond the stopper.

16. The device of claim 15, wherein the stopper comprises a lip protruding from a surface of the top cover, and the lip forms a substantially V-shaped notch with the surface of the top cover, wherein the tab is at an end of the lip.

17. The device of claim 15, wherein the top cover and the stopper define between them a general hook shape.

18. The device of claim 15, comprising scanning sensors in the top cover scanning the sheet as the sheet is advanced by the sheet rollers.

19. The device of claim 15, wherein the top cover is angled downwards, and the sheet advancing on the top cover is angled downwards.

20. The device of claim 15, wherein the stopper is attached to the top cover or integral with the top cover.

* * * * *